R. G. BREEDING.
LIQUID FUEL BURNING FURNACE.
APPLICATION FILED OCT. 26, 1918.
1,341,294.
Patented May 25, 1920.
2 SHEETS—SHEET 1.
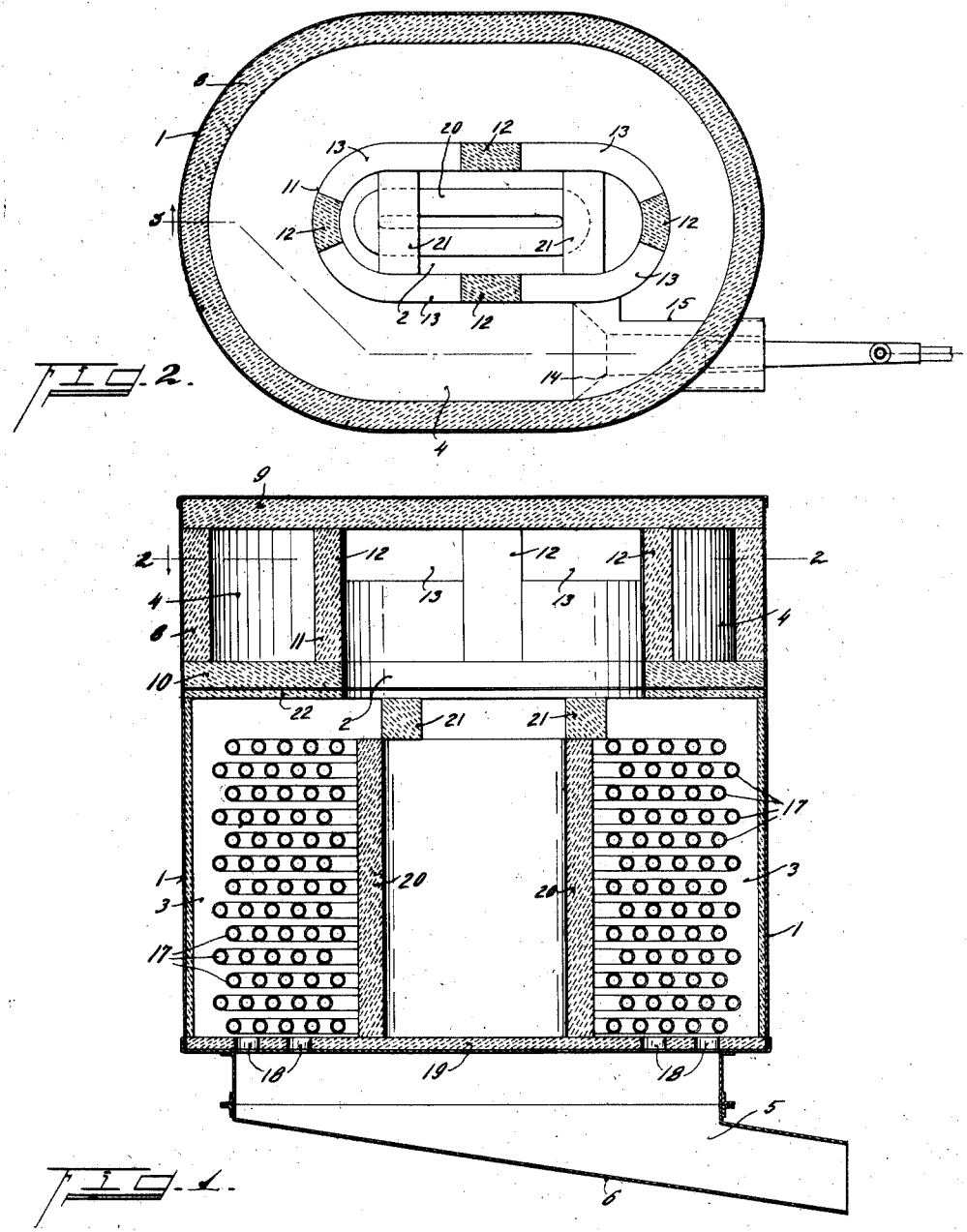

R. G. BREEDING.
LIQUID FUEL BURNING FURNACE.
APPLICATION FILED OCT. 26, 1918.

1,341,294.

Patented May 25, 1920.
2 SHEETS—SHEET 2.

Inventor:
Robert G. Breeding
Word & Word
Attorneys.

UNITED STATES PATENT OFFICE.

ROBERT G. BREEDING, OF CINCINNATI, OHIO.

LIQUID-FUEL-BURNING FURNACE.

1,341,294.   Specification of Letters Patent.   Patented May 25, 1920.

Application filed October 26, 1918. Serial No. 259,845.

*To all whom it may concern:*

Be it known that I, ROBERT G. BREEDING, a citizen of the United States, and residing at Cincinnati, in the county of Hamilton and State of Ohio, have invented a new and useful Improvement in Liquid-Fuel-Burning Furnaces, of which the following specification is a full disclosure.

My invention relates to a liquid or oil burning furnace particularly for a steam generator or boiler especially adapted for automobiles and various types of motor cars.

An object of the invention is to provide a down draft furnace having communicating combustion and heat chambers, with the heat chamber, within which the boiler is sustained, disposed below the combustion chamber, so as not to be subjected to direct contact with the flame of the burning fuel in the combustion chamber, and whereby the radiating heat from the heat chamber is utilized for aiding and maintaining combustion of the fuel in the combustion chamber and for superheating the steam in the upper portion of the boiler.

Another object of the invention is to provide a circuitous chamber for vaporizing and consuming liquid fuel products around a central opening leading into a heat chamber.

Another object of the invention is to render a low volatile or grade of oil available as a fuel for furnaces by blasting the same into a circuitous vaporizing chamber.

Another object of my invention is to provide a combustion chamber having a circuitous vaporizing channel varying in cross-sectional area throughout its length, and in which the channel is partly formed by an inner wall completely within the combustion chamber, providing an incandescent baffle for the liquid fuel blasted into the channel.

Another object of the invention is to surround a combustion chamber with a fuel vaporizing chamber having annular communication with the combustion chamber.

The features of my invention are more fully set forth in the description of the accompanying drawings, forming a part of this specification, in which:

Figure 1 is a central vertical section of the furnace on line of its major axis.

Fig. 2 is a plan section on line 2, 2, Fig. 1.

Figure 3:
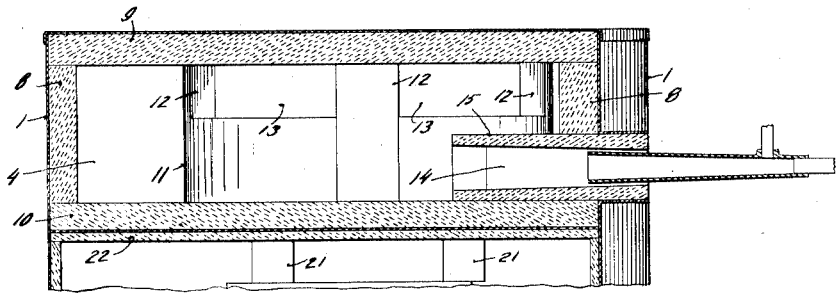
Fig. 3 is a vertical section of the upper portion of the furnace taken on line 3, 3, Fig. 2.
Figure 4:
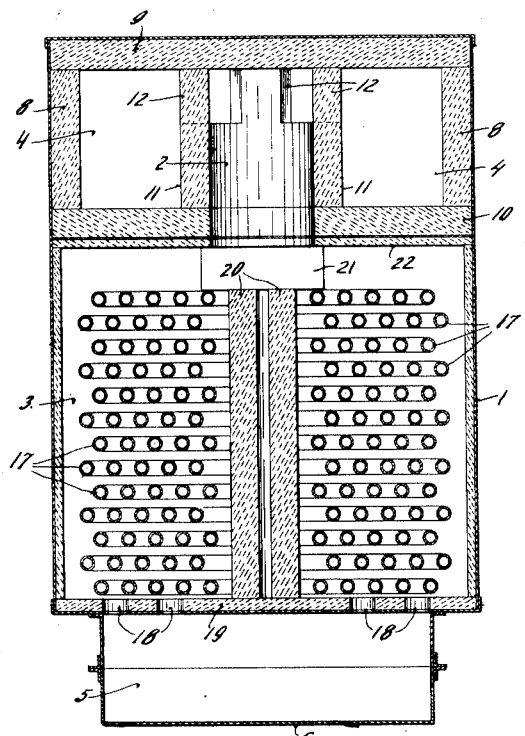
Fig. 4 is a central vertical section of the furnace on line of its minor axis.

Referring to the drawings, it will be observed that the furnace walls are of a refractory material capable of sustaining the highest heat generated in the furnace without fusion, and its outer walls are inclosed or surrounded by a sheet metal shell or casing 1. The furnace is divided to provide two communicating chambers arranged in a superposed relation with a down-draft course therethrough. The upper chamber 2 may be designated as a combustion chamber surrounded by a vaporizing chamber or channel into which the fuel is blasted. The combustion chamber 2 communicates with the chamber 3 below, as a heat chamber, within which the boiler tubes are sustained, the heat from the combustion chamber passing downwardly through the heat chamber into an exhaust passage 5 formed by the casing 6 at the base of the furnace. The walls forming the combustion and vaporizing chambers are of oval form to provide a circuitous course to the incoming fuel charge blasted into the furnace from one end of the course tangentially with respect to the furnace, so that the fuel products are agitated under whirling currents created by moving in a circular path and by striking against the curved portion of the walls. The vapors of the highly volatile products are quickly ignited and flashed against and over the wall dividing the vaporizing and combustion chamber, and into the combustion chamber, which wall becomes an incandescent baffle for vaporizing the lower volatile products, bringing about a complete combustion and consumption, so as to avoid the transmission of unconsumed products downwardly through the heat chamber below, which might result in a carbonaceous deposit on the boiler tubes in the heat chamber, a disadvantage which is common to steam generators now in use.

The vaporizing chamber or channel 4 may be of any circuitous form, as, for instance, circular instead of oval to give it the necessary passage length within a limited area to make a compact and reduced size of furnace essential for motor vehicle use.

The vaporizing and combustion chambers are formed by the outer wall 8, top wall 9 closing the top of the furnace and combustion chamber, base wall 10 and the inner oval wall 11 spaced from the outer wall 8. The inner wall 11 forms the division walls between the vaporizing channel 4 and combustion chamber 2 and is extended at several points 12 to engage the top wall 9 as a brace or central support therefor. This inner wall 11 is of a height to provide restricted upper openings 13 between the vaporizing channel and combustion chamber, and the wall also qualifies as a heated baffle for the incoming fuel. The outer wall at one side of the furnace is formed to provide a fuel inlet passage 14 extending in a line tangentially to the outer and inner walls, and centrally with the channel 4 formed by said inner, outer and base walls, and terminal for the channel, as indicated by the wall portion 15.

The wall portions forming the inlet passage 14 may be regarded as a nozzle which tapers outwardly to meet the wall portions forming the vaporizing channel 4. The vaporizing channel 4 varies in width throughout its length as it is wider at the forward sector than at the rear or terminal sector. The fuel blast may be heated before entering the furnace and the nozzle may be of a construction to qualify as a mixer depending upon the kind and grade of fuel used, and, therefore, is susceptible to change to meet the special requirements for a particular kind of fuel. The design of nozzle shown is particularly adapted for a very low grade of heavy oil which heretofore has been valueless for motor vehicle use.

The heat from the vaporizing chamber flashes through the openings 13 and thence downwardly into the heat chamber 3 through the chamber 3 over the boiler tube 17 escaping through the ports 18 through the base 19 of the chamber and into the exhaust passage 5.

A vertical wall 20 of oval outline in cross section extends centrally into the heat chamber from the base 19 to within a short distance of the top of the heat chamber for confining the heat within an oval heat chamber space within which the coils of the boiler are sustained. This blocks off a direct central passage of the heat through the heat chamber. The wall 20 also provides a central support for the walls of the combustion chamber. Cross blocks 21, 21, rest on top of the central wall 20 and extend across the central base opening of the combustion chamber, with the opposite edges of the block engaged beneath the top wall 22 of the heat chamber.

The fuel charge is fed or blasted into the furnace through the nozzle or inlet passage, into the vaporizing channel, where it is vaporized, ignited and flashed against and over the inner wall 11 into the combustion chamber 2, so that the combustible products and flames of the burning charge are thrown against the exposed surfaces of the combustion chamber.

The vaporizing chamber or channel completely surrounds the combustion chamber and the whirling flame is flashed from the vaporizing chamber surroundingly into one end of the combustion chamber in a plane normal to the axes of the combustion chamber.

Therefore any unconsumed products must pass through the whirling flame and an intensive heat zone, before it can enter the combustion chamber, bringing about a complete combustion and consumption, so as to avoid the transmission of products downwardly or into the heat or boiler chamber of such a nature as might be calculated to incrust or coat the boiler tubes or coil.

The boiler within the heat chamber is preferably a continuous ascending tube formed of a series of coils 17 in which feed water is vaporized and superheated, the inlet being at the base coils and the outlet at the top coil of the series. Thus the heat from the combustion chamber is first brought into contact with that part of the tube containing the dryest steam and farthest removed from that part of the tube into which the feed water enters, providing for a continuous flow in the tube in a direction counter or opposed to the direction of the heat currents. The boiler may therefore be regarded as divided into three sections, a base section in which the incoming water enters, a vaporizing section in which the water has to be heated to the point of vaporizing and a section containing steam in which the steam is superheated.

The action in the tube is progressive and continuous and in a manner best adapted to utilize the heat.

The type of boiler and location of the heat chamber with respect to the vaporizer and combustion chambers, may be variously modified, as in some types of boiler the updraft may be the more efficient, and it is, therefore, to be understood that various changes may be made in the details of construction and arrangement of parts, without departing from the spirit of the invention.

The furnace as a unit is described as comprising a liquid fuel vaporizing channel or chamber, a combustion chamber surrounded by the vaporizing channel, and a heat or generative chamber, that portion below the vaporizing channel and combustion chamber, containing the coil.

Such designations, however, are made merely for the purpose of giving a clear understanding of the structure and are not intended as distinctive elements necessary to the combination, as it is quite obvious that the combustion and generator chambers might properly be referred to as a single chamber, without departing from the spirit of the invention or limiting its scope, except as such restriction is particularly set up and embodied in the claims.

Having described my invention, I claim:

1. A liquid fuel burning furnace comprising a hollow furnace casing, having an oval side wall and an opening through the central portion of the base, an oval partition wall eccentrically disposed within said casing around said base opening, said wall interiorly dividing the casing into a combustion chamber and an annular fuel vaporizing channel communicating at the top with said combustion chamber, a casing below the furnace casing, providing a chamber communicating with and a down draft flue from said combustion chamber, and a fuel inlet nozzle leading tangentially into said channel.

2. A liquid fuel burning furnace comprising a hollow furnace casing having an annular side wall, a partition wall disposed and arranged within said casing interiorly dividing the casing into a combustion chamber and an annular fuel vaporizing channel of varying cross-sectional area throughout its length, communicating with said chamber at its top, and a fuel nozzle leading tangentially into said channel.

3. A liquid fuel burning furnace comprising a hollow furnace casing having an annular side wall and an opening through its base, a partition wall disposed around said casing base opening and arranged within said casing interiorly dividing the casing into a combustion chamber and an annular fuel vaporizing channel of varying cross-sectional area throughout its length communicating with said chamber at the top, said wall having extensions connecting with the top of said casing, and a fuel nozzle leading tangentially into said channel.

4. A liquid fuel burning furnace comprising a hollow furnace casing having an annular side wall and an opening through its base, a partition wall disposed around said casing base opening and arranged within said casing interiorly dividing the casing into a combustion chamber and an annular fuel vaporizing channel of varying cross-sectional area throughout its length communicating with said chamber at the top, said wall having extensions connecting with the top of said casing, a fuel nozzle leading tangentially into said channel, and a casing below said furnace casing having a central wall therein providing an annular chamber communicating with said combustion chamber through said base opening and a down draft flue for said combustion chamber.

In witness whereof, I hereunto subscribe my name, as attested by the two subscribing witnesses.

ROBERT G. BREEDING.

Witnesses:
L. A. BECK,
C. B. FOSTER.